US008310983B2

(12) United States Patent
Novak et al.

(10) Patent No.: US 8,310,983 B2
(45) Date of Patent: Nov. 13, 2012

(54) METHOD AND APPARATUS FOR PERFORMING TIMING SYNCHRONIZATION IN A WIRELESS COMMUNICATION SYSTEM

(75) Inventors: Peter D. Novak, Keller, TX (US);
Thomas G. Perry, Fort Worth, TX (US);
Dale E. Ray, Fort Worth, TX (US)

(73) Assignee: Motorola Mobility LLC, Libertyville, IL (US)

( * ) Notice: Subject to any disclaimer, the term of this patent is extended or adjusted under 35 U.S.C. 154(b) by 346 days.

(21) Appl. No.: 12/686,442

(22) Filed: Jan. 13, 2010

(65) Prior Publication Data

US 2011/0158114 A1 Jun. 30, 2011

Related U.S. Application Data

(60) Provisional application No. 61/290,351, filed on Dec. 28, 2009.

(51) Int. Cl.
*H04B 7/212* (2006.01)
(52) U.S. Cl. ........ 370/324; 370/315; 370/319; 370/503; 375/215; 375/294
(58) Field of Classification Search ........................ None
See application file for complete search history.

(56) References Cited

U.S. PATENT DOCUMENTS

| 5,809,397 | A |  | 9/1998 | Harthcock et al. |
| 2008/0199183 | A1 | * | 8/2008 | Liu et al. ........................ 398/103 |
| 2009/0170543 | A1 | * | 7/2009 | Mostafa et al. ............... 455/502 |
| 2009/0217074 | A1 | * | 8/2009 | Nichols et al. ................ 713/401 |
| 2010/0093391 | A1 | * | 4/2010 | Saban et al. ............... 455/552.1 |

FOREIGN PATENT DOCUMENTS

CN 101267251 A 9/2008

OTHER PUBLICATIONS

Patent Cooperation Treaty, International Search Report and Written Opinion of the International Searching Authority for International Application No. PCT/US2010/061220, Apr. 14, 2011, 23 pages.

* cited by examiner

*Primary Examiner* — Donald Mills

(57) ABSTRACT

A method and apparatus for performing time synchronization is provided. The method/apparatus includes, at a radio subsystem: receiving, from a digital subsystem, a first signal via the link, where the link not dedicated to timing synchronization; determining a time difference between the first signal and a second signal; converting the time difference to a time error, sending, via the link, the time error or time difference to the digital subsystem. The method further includes, at the digital subsystem, inputting the time error, received from the radio subsystem, to a phased locked loop (PLL) in order to adjust an oscillator frequency so as to reduce the amount of the time error and thus synchronizing the radio access network with the second signal received at the radio subsystem, without the need for an additional connection between the digital and radio subsystems.

16 Claims, 4 Drawing Sheets

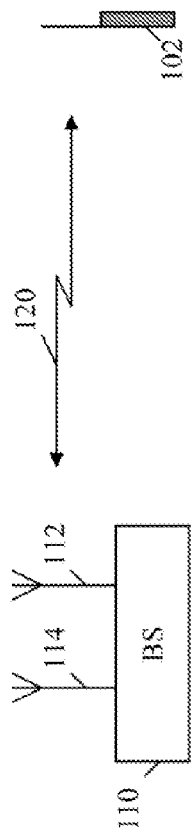
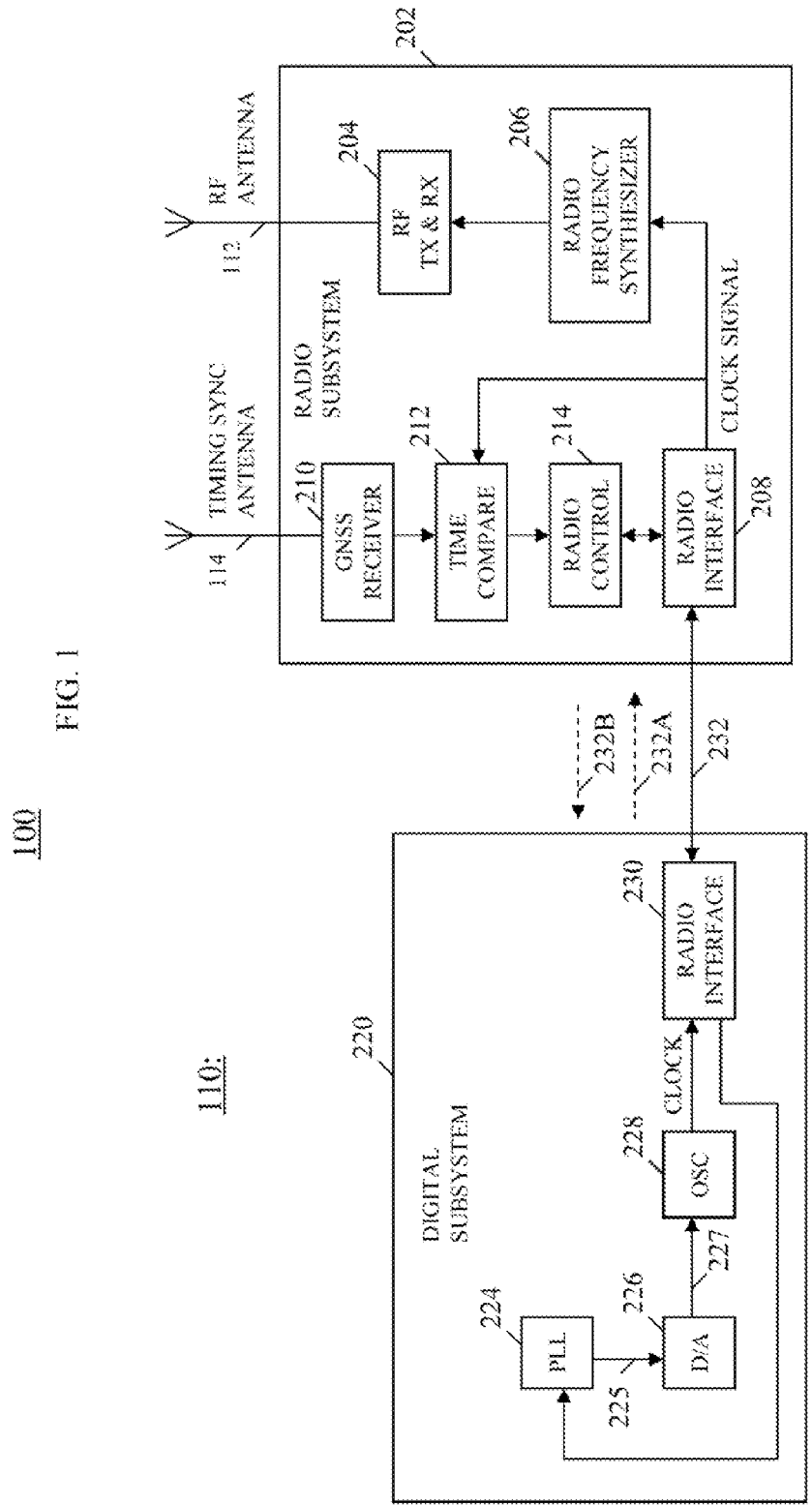
FIG. 1
FIG. 2

METHOD AND APPARATUS FOR PERFORMING TIMING SYNCHRONIZATION IN A WIRELESS COMMUNICATION SYSTEM

CROSS-REFERENCE TO RELATED APPLICATION

This application claims priority from provisional application Ser. No. 61/290,351, entitled "METHOD AND APPARATUS FOR PERFORMING TIMING SYNCHRONIZATION IN A WIRELESS COMMUNICATION SYSTEM," filed Dec. 28, 2009, which is commonly owned and incorporated herein by reference in its entirety.

FIELD OF THE INVENTION

The present disclosure relates generally to communication systems and more particularly to a method and apparatus for performing time synchronization in a wireless communication system.

BACKGROUND

Cellular communication systems often require that base transceiver station (BTS) radio frequency (RF) signals be time aligned with each other. The timing alignment requirement may further require an accuracy of alignment on the order of a few microseconds to a recognized timing reference. For example, timing misalignment may result in signals associated with multiple mobile stations interfering with each other or may make it difficult for a mobile station to combine signals received from multiple base transceiver stations (BTSs). Cellular communication systems also may require that the RF signals be aligned to absolute time.

One known way of meeting these timing alignment requirements is through utilization of a timing synchronization reference signal that is broadcast system-wide, that is, a Global Navigation Satellite System (GNSS) signal such as a Global Positioning Satellite (GPS) signal, a Global Navigation Satellite System (GLONASS) signal, or a Galileo system signal. Typically, such signals are broadcast by a satellite system to the BTSs and require use of a timing synchronization antenna and receiver, such as a GPS, GLONASS, or Galileo system receiver, separate from a BTS's RF antenna and circuitry in order to receive the signal. The timing synchronization receiver is co-located with the BTS's synchronization circuitry in the BTS's digital subsystem, separate and apart from the BTS's radio, or RF, subsystem, so as to minimize error in the transfer of the timing reference signal from the special receiver to the synchronization circuitry. The digital subsystem is typically located inside a building where it is convenient for access, maintenance and connection to the digital sub-system interfaces. However, the timing synchronization antenna needs to be located outdoors with line-of-sight access to the satellite system in order to receive the satellite signal. A favorable location for the timing synchronization antenna usually is proximate to the radio subsystem, which may be anywhere from one meter to 20 kilometers, or more, distant from the digital subsystem, Traditionally, the cable connecting the digital sub-system to the timing synchronization antenna is a dedicated cable, and depending on the installation details, this cable can be a lengthy and expensive cable to install and maintain.

Therefore, there is a need for a simpler, less expensive method and apparatus for performing time synchronization that takes advantage of the potentially spatially diverse components of the wireless communication system to yield a lower cost timing synchronization solution.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 1 is a block diagram illustration of a wireless communication system in accordance with an embodiment of the present invention.

FIG. 2 is a block diagram illustration of a Remote Radio Head (RRH) configuration for a base station of FIG. 1 in accordance with an embodiment of the present invention.

Figure 3:
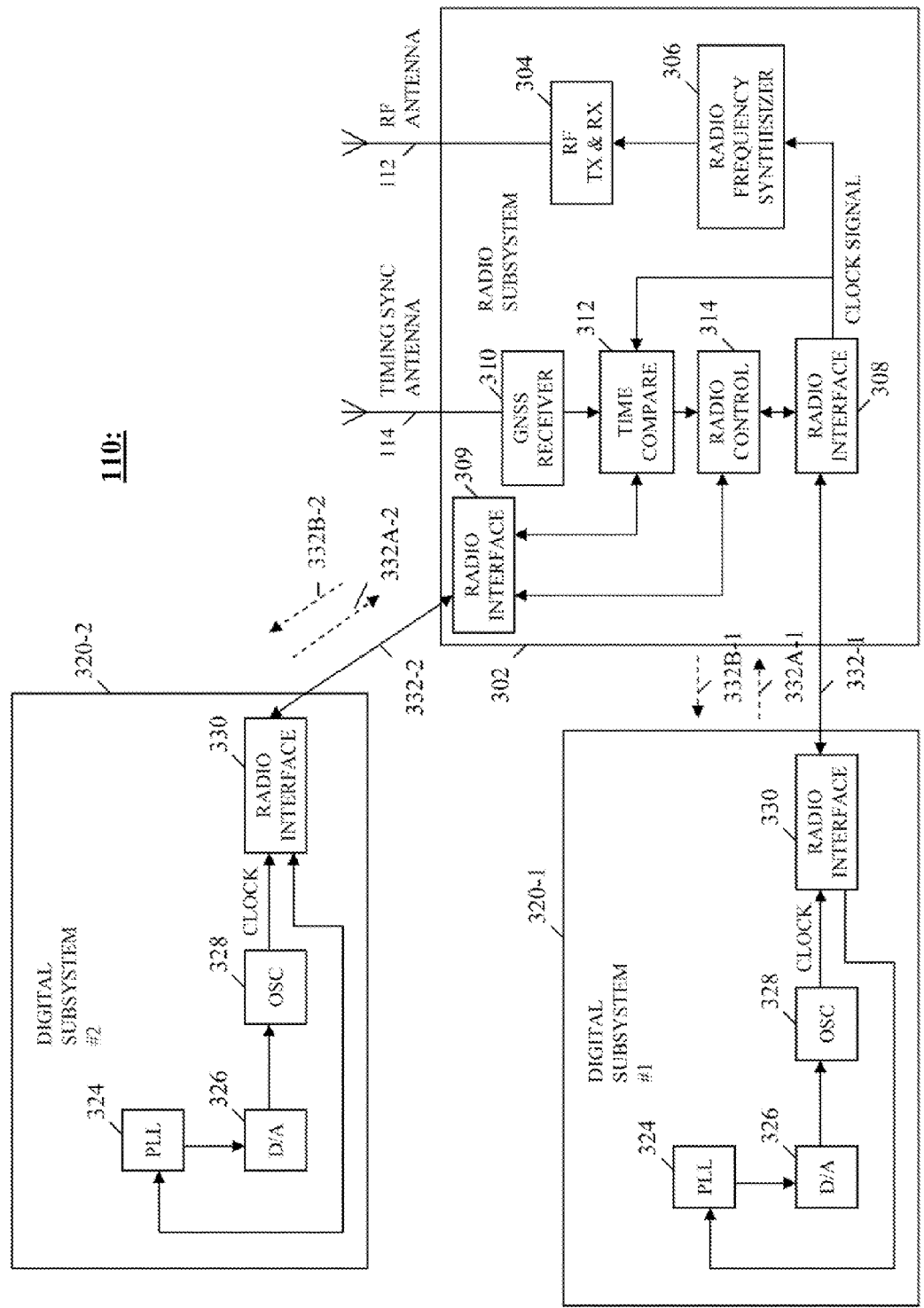
FIG. 3 is a block diagram illustration of a Remote Radio Head (RRH) configuration for a base station of FIG. 1 in accordance with another embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method for performing time synchronization is provided. The method includes at the radio subsystem: receiving, from the digital subsystem, a first signal via the link, where the link not dedicated to timing synchronization; determining a time difference between the first signal and a second signal; converting the time difference to a time error, sending, via the link, the time error or time difference to the digital subsystem. The method further includes, at a digital subsystem, inputting the time error, received from the radio subsystem, to a phased locked loop (PLL) in order to adjust an oscillator frequency so as to reduce the amount of the time error and thus synchronizing the radio access network with the second signal received at the radio subsystem, without the need for an additional connection between the digital and radio subsystems or the digital subsystem and GNSS system.

Referring now to the figures, FIG. 1 is a block diagram illustrating a wireless communication system 100 in accordance with an embodiment of the present invention. Wireless communication system 100 may be any type of communication system that implements communication services between various wireless subscribers. For example, communication system 100 may operate according to, but not limited to, any one or more of the OMA (Open Mobile Alliance), 3GPP (3rd Generation Partnership Project), 3GPP2 (3rd Generation Partnership Project 2), IEEE (Institute of Electrical and Electronics Engineers) 802.xx, and WiMAX Forum standards. As used herein, a "communication system" is a system that includes one or more network-based communication devices that communicate with wireless user communication devices in the system and that manages communication between the communication devices.

Communication system 100 includes at least one mobile station (MS) 102 (one shown), such as, but not limited to, devices commonly referred to as access terminals, mobile radios, mobile stations, subscriber units, user equipment, mobile devices, or any other user device capable of operating in a wireless environment. Examples of a mobile station (MS) such as MS 102 include, but are not limited to, two-way radios, mobile phones, cellular phones, Personal Digital Assistants (PDAs), laptops and pagers. Communication system 100 further includes at least one base station (BS) 110 (one shown), such as but not limited to a Node B, an Access Point, eNodeB or a Base Transceiver Station (BTS). Base station (BS) 110 provides wireless service to mobile stations (MSs), such as MS 102, residing in a corresponding coverage area of the BS via one or more radio antennas 112 (one radio antenna shown) of the BS and an associated air interface 120. BS 110 further includes a timing reference signal receiver antenna 114 for receiving a broadcast timing reference signal, that is, a Global Navigation Satellite System (GNSS) signal, such as a Global Positioning Satellite (GPS) signal, a Global Navigation Satellite System (GLONASS) signal, or a Galileo system signal.

Preferably, communication system 100 is a 3GPP (Third Generation Partnership Project) UMTS LTE (Universal Mobile Telecommunications System Long Term Evolution) communication system. However, one of ordinary skill in the art realizes that communication system 100 may be any kind wireless communication system that utilizes a common, broadcast, timing reference signal to perform timing alignment. For example, communication system 100 may utilize any of an Code division multiple access (CDMA) protocol, Time division multiple access (TDMA) protocol, Global System for Mobile communications (GSM) protocol, Integrated Digital Enhanced Network (iDEN) protocol, General Packet Radio Service (GPRS) protocol, Enhanced Data rates for GSM Evolution (EDGE) protocol, Universal Mobile Telecommunications System (UMTS) protocol, Code division multiple access 2000 (CDMA 2000) protocol, IEEE802.16e or IEEE802.16m (WiMAX) and their variants.

BS 110 is implemented using a remote radio head (RRH) configuration. The RRH configuration is a distributed base station configuration, wherein all radio-related functions are contained in a radio subsystem mounted close to the radio subsystem antenna, and linked to a digital subsystem that contains control and baseband signal processing. The RRH configuration enables operators to lower capital and operating expenditures and reduce typical power requirements. Further, the RRH configuration also adds flexibility to network configurations, and provides exceptional flexibility for the operators that face deployment constraints based on site acquisition challenges or physical limitations with different sites.

Referring now to FIG. 2, a block diagram is provided of an RRH configuration of BS 110 in accordance with an embodiment of the invention. The RRH configuration of BS 110 includes two parts, that is, a first part comprising a radio subsystem 202 and a second part comprising a digital subsystem 220. Radio subsystem 202 and digital subsystem 220 are located remotely from each other (as opposed to being co-located). For example, radio subsystem 202 and digital subsystem 220 may be separated by a distance of anywhere from less than one meter to 20 kilometers or more.

Radio subsystem 202 includes radio antenna 112, which is communicatively connected to a radio frequency (RF) synthesizer 206 via an RF transceiver 204. RF synthesizer 206 receives a communication clock signal 232A from digital subsystem 202 via a radio interface 208 of the radio subsystem.

Radio subsystem 202 also includes a satellite system timing reference signal receiver 210, in particular a Global Navigation Satellite System (GNSS) receiver, such as a GPS, a GLONASS, or a Galileo receiver. GNSS receiver 210 is communicatively coupled to timing reference signal antenna 114 for receiving an absolute time reference signal, such as a Coordinated Universal Time (UTC) signal or other similar signal, from a satellite system. The absolute time reference signal is used as a first input to a time comparator 212 coupled to GNSS receiver 210. Time comparator 212 also is coupled to radio interface 208 and receives communication clock signal 232A from digital subsystem 220 via radio interface 208, a radio interface 230 of digital subsystem 220, and a control signal link 232. Time comparator 212 determines a timing difference between the absolute time reference signal and communication clock signal 232A and conveys an error signal comprising an indication of the determined timing difference to a radio controller 214 coupled to the time comparator. Radio controller 214 then transmits an error signal 232B comprising an indication of the determined timing difference and other information related to the validity and status of the absolute time reference signal, via radio interface 208, radio interface 230 of digital subsystem 220, and control signal link 232. The error signal may or may not be adjusted to compensate for a control signal link delay, that is, a delay in the transfer of the signal 232A from digital subsystem 220 to the radio subsystem 202 before the time comparison. This link delay adjustment may be determined based on one or more of a measured link delay or a predetermined link delay, as further described below.

Radio interfaces 208 and 230 and control signal link 232 provide upstream and downstream links between radio subsystem 202 and digital subsystem 220 and also are used to exchange non-timing synchronization related control signals and information between radio subsystem 202 and digital subsystem 220. That is, radio interfaces 208 and 230 and control signal link 232 are shared by the control systems and timing synchronization systems of BS 110, as opposed to prior art BSs where the control system and the timing synchronization system each has a dedicated radio interface and a dedicated intervening signaling link.

Digital subsystem 220 includes radio interface 230 for communicating with radio subsystem 202. Radio interface 230 is used for transmitting communication clock signal 232A to radio subsystem 202 and for receiving error signal 232B from the radio subsystem. Radio interface 230 may also contain other information not related to the clock signals that is transferred between the digital subsystem and the radio subsystem. Digital subsystem 220 also includes a Phase Locked Loop (PLL) 224 that processes error signal 232B and produces a digital correction signal 225. PLL 224 conveys digital correction signal 225 to a Digital to Analog converter (D/A) 226, which converts the digital correction signal to an analog correction signal 227. D/A 226 conveys analog correction signal 227 to an oscillator 228. Oscillator 228, which generates the communication clock signal 232A provided by digital subsystem 220 to radio subsystem 202, then adjusts the timing and frequency of the communication clock signal based on the analog correction signal to produce a corrected communication clock signal 232A. Oscillator 228 then conveys the corrected communication clock signal 232A to radio subsystem 202 via radio interface 230, thereby synchronizing BS 110 with the absolute time reference signal based on the corrected communication clock signal output from the PLL.

Referring now to FIG. 3, a block diagram is provided of an RRH configuration of BS 110 in accordance with another embodiment of the invention. Similar to the RRH configuration depicted in FIG. 2, BS 110 comprises a radio subsystem 302 having a radio frequency (RF) synthesizer 306 that is communicatively connected to radio antenna 112 via an RF transceiver 304, a satellite system timing reference signal receiver 310 communicatively coupled to timing reference signal antenna 114 and to a time comparator 312, and a radio controller 314 coupled to the time comparator. However, unlike the RRH configuration depicted in FIG. 2, radio subsystem 302 includes multiple radio interfaces 308, 309 (two shown), wherein each radio interface 308, 309 provides an interface for communicating with a digital subsystem of multiple digital subsystems 320-1, 320-2 (two shown) via a corresponding control signal link 332-1, 332-2. That is, radio subsystem 302 includes a first radio interface 308 that provides an interface for communicating with a first digital subsystem 320-1 of the multiple digital subsystems 320-1, 320-2 via a first control signal link 332-1 and a second radio interface 309 that provides an interface for communicating with a second digital subsystem of the multiple digital subsystems 320-2 via a second control signal link 332-2. In various embodiments of the present invention, the first and second radio interfaces 308, 309 may be the same or different interfaces. Also, similar to the RRH configuration depicted in FIG. 2, each of the multiple digital subsystems 320-1, 320-2 comprises a radio interface 330 for communicating with radio subsystem 302, an oscillator coupled to the radio interface, an Digital to Analog converter (D/A) 326 coupled to the oscillator, and a Phase Locked Loop (PLL) 324 coupled to the D/A.

The operation of radio subsystem 302 and digital subsystems 320-1 and 320-2 is identical to that of radio subsystem 202 and digital subsystem 220, except that radio subsystem 302 determines a timing difference between an absolute time reference signal and a communication clock signal for each of digital subsystems 320-1 and 320-2. That is, for each of for each of digital subsystems 320-1 and 320-2, time comparator 312 determines a timing difference between an absolute time reference signal received via antenna 114 and a communication clock signal 332A-1, 332A-2 received from the digital subsystem and conveys an error signal comprising an indication of the determined timing difference to radio controller 314 coupled to time comparator 312. Radio controller 314 then transmits, to each digital subsystem 320-1, 320-2 a corresponding error signal 332B-1, 332B-2 comprising an indication of the determined timing difference and other information related to the validity and status of the timing.

In yet another embodiment of the present invention, instead of using an absolute timing reference signal received via antenna 114 to determine a timing difference and provide timing synchronization, radio subsystem 302, and in particular time comparator 312, may determine a timing difference by determining a timing difference between communication clock signals 332A-1 and 332A-2 that are respectively received via control signal link 332-1 and radio interface 308 and via control signal link 332-2 and radio interface 309, and convey an error signal comprising an indication of the determined timing difference to radio controller 314. Radio controller 314 then transmits, to each digital subsystem 320-1, 320-2, the corresponding error signals 332B-1 and 332B-2, which error signals comprise an indication of the determined timing difference between communication clock signals 332A-1 and 332A-2 (and other information related to the validity and status of the timing), thereby synchronizing digital subsystem 320-1 to digital subsystem 320-2. In such an embodiment, timing synchronization antenna 114 and GNSS receiver 310 are optional elements of radio subsystem 302, that is, they may or may not be present in the radio subsystem. RF antenna 112, RF transceiver 304, and RF synthesizer 306 also are optional elements in such an embodiment.

Figure 4:
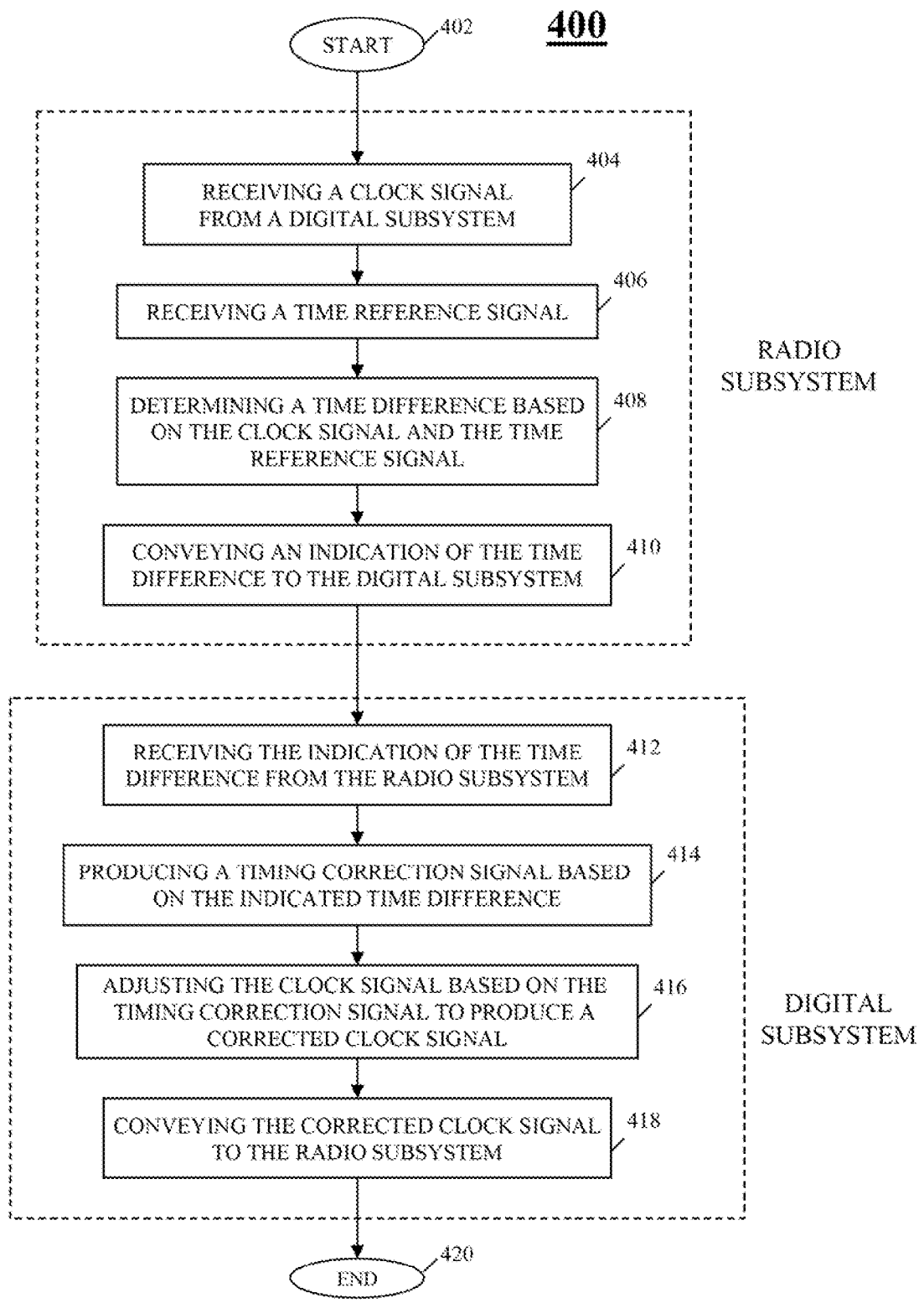
FIG. 4 is a logic flow diagram illustrating a method for performing timing synchronization in the wireless communication system of FIG. 1 in accordance with various embodiments of the present invention.

Turning now to FIG. 4, a logic flow diagram 400 is provided that illustrates a method executed by communication system 100, and in particular by a BS such as BS 110, for performing timing synchronization in accordance with various embodiments of the present invention. The method is performed in a distributed manner at a radio subsystem, such as radio subsystems 202 and 302, and a digital subsystem, such as digital subsystems 220, 320-1, and 320-2, of the BS. While reference is made in logic flow diagram 400 to the elements of radio subsystem 202 and digital subsystem 220, these elements are referenced merely for purposes of clarity and one of ordinary skill in the art realizes that the method applies to any BS that utilizes an RRH configuration, such as a BS implementing any of radio subsystems 202 and 302 and digital subsystems 220, 320-1, and 320-2.

Logic flow diagram 400 begins (402) when radio subsystem 202 receives (404) a communication clock signal from the digital subsystem 220 via link 232, which link also carries control messages and responses between the digital subsystem and the radio subsystem. In one embodiment of the present invention, digital subsystem 220 sends a time offset communication clock signal to radio subsystem 202, which communication clock signal is offset by an amount that is based on a determined propagation delay of link 232 between the digital subsystem and the radio subsystem. Such a propagation delay may be predetermined or may be measured by radio interface 230 based on an earlier exchange of signals between digital subsystem 220 and radio subsystem 202. In another embodiment of the present invention, the PLL 224 adjusts the timing error signal by an amount based upon the determined propagation delay of link 232 between the digital subsystem and the radio subsystem. The propagation delay may be predetermined or may be measured by the radio interface 230 base on an earlier exchange of signals between digital subsystem 220 and radio subsystem 202. In another embodiment of the present invention, radio interface 208 of radio subsystem 202 may determine a propagation delay of the received communication clock signal and then adjust the communication clock signal with respect to the determined propagation delay, prior to radio subsystem 202 determining a timing error. Again, such a propagation delay may be predetermined or may be measured by radio interface 208 based on an earlier exchange of signals between radio subsystem 202 and digital subsystem 220.

Radio subsystem 202 also receives (406) an absolute time reference signal from GNSS receiver 210. However, in other embodiments of the invention, the absolute time reference may be received from a digital subsystem other than the one being synchronized. On receiving both the signals, radio subsystem 202 determines (408) a time difference between the absolute time reference signal and the communication clock signal. Radio subsystem 202 then conveys (410) a timing error signal, comprising an indication of the determined time difference, to digital subsystem 220 over the control signal link 232 between the digital subsystem and the radio subsystem.

Digital subsystem 220 receives (412) the timing error signal from radio subsystem 220 and routes the timing error signal to PLL 224 to adjust the operation of oscillator 228. PLL 224 produces (414) a timing correction signal 225 based on the timing error signal, and in particular the time difference, and routes the timing correction signal to oscillator 228 via D/A 226. PLL 224 further may apply a target time difference in producing the timing correction signal, that is, may produce a timing correction signal that is designed to adjust the communication clock signal such that the time difference between the absolute time reference signal and the communication clock signal is approximately the target time difference. Based on the timing correction signal received from the PLL, oscillator 228 adjusts (416) the communication clock signal to produce a corrected communication clock signal 232A which is derived from the output of oscillator 228, and conveys (418) the corrected communication clock signal back to radio subsystem 202. Logic flow 400 then ends (420). However, in practice the process depicted in FIG. 4 is a continuous process that returns to step 404 after step 418, repeating intermittently and/or periodically based on the repeated occurrence of steps 404 and 406.

Figure 5:
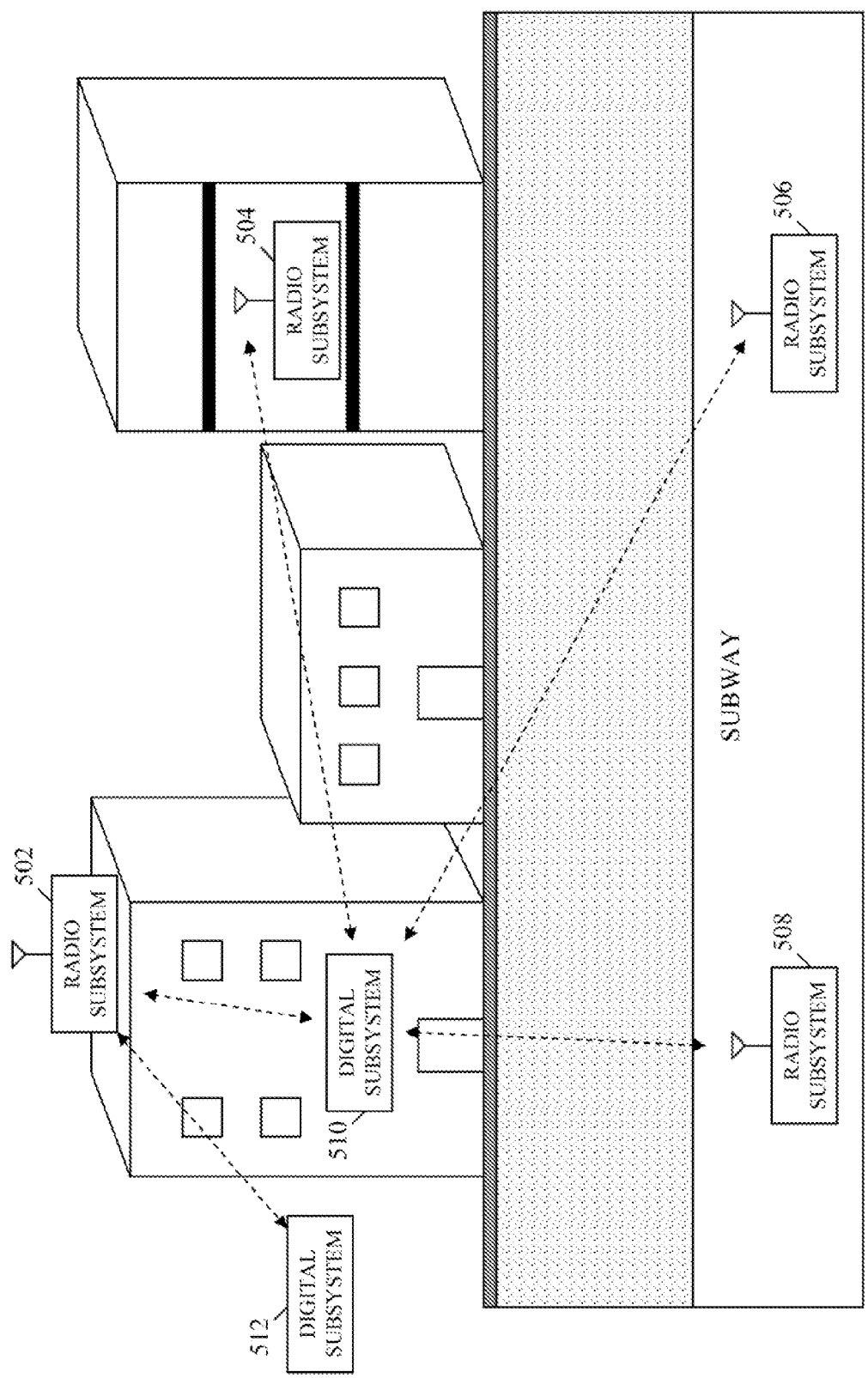
FIG. 5 is a system diagram illustrating a wireless communication system in accordance with another embodiment of the present invention.

Referring now to FIG. 5, a system diagram is provided that illustrates a wireless communication system 500 wherein multiple RRHs, and in particular multiple radio subsystems, are synchronized using a single digital subsystem in accordance with another embodiment of the present invention.

Communication system 500 includes multiple radio subsystems 502, 504, 506, 508 that are each coupled to a same digital subsystem 510. Radio subsystems 502, 504, 506, 508 may be geographically dispersed. For example, radio subsystem 504 may be installed within a building and radio subsystems 506 and 508 may be installed within a subway system. Thus, radio subsystems 504, 506, and 508 do not have clear visibility to sky and may not be able to receive a satellite-based timing reference signal, such as a GNSS absolute time signal.

Therefore, in order to time synchronize the radio subsystems 504, 506, and 508, a radio subsystem having clear visibility to the sky, that is, radio subsystem 502, will receive the satellite-based timing reference signal and determine a timing error signal based on the received satellite-based timing reference signal and a clock signal received from a digital subsystem 510 shared by radio subsystems 502, 504, 506, 508. Radio subsystem 502 then sends the timing error signal to digital subsystem 510. On receiving the timing error signal, digital subsystem 510 synchronizes the clocks for all four radio subsystems 502, 504, 506, and 508. Thus, a single timing reference signal receiver, such as a GNSS receiver, installed within radio subsystem 502 is used to synchronize the clocks for multiple radio subsystems.

Communications system 500 could also include a second digital subsystem 512 which is also connected to radio subsystem 502, where digital subsystem 512 has no direct connection with digital subsystem 510. The second digital subsystem 512 can also receive timing difference information from radio subsystem 502. Thus, a single timing reference signal receiver, such as a GNSS receiver, installed within radio subsystem 502 can be used to synchronize the clocks for multiple digital subsystems.

The invention claimed is:

1. A method for timing synchronization in a base station comprising a radio subsystem that is coupled to a plurality of digital subsystems via a link not dedicated to timing synchronization, the method comprising:
   at the radio subsystem:
      receiving, from a first digital subsystem of the plurality of digital subsystems, a first signal via the link;
      determining a time difference between the first signal and a second signal sourced by a second digital subsystem of the plurality of digital subsystems;
      sending, via the link, an indication of the time difference to at least one of the plurality of digital subsystems;
   at the at least one of the plurality of digital subsystem:
      inputting the indication of the time difference received from the radio subsystem to a phase locked loop (PLL); and
      synchronizing the base station with the second signal based on an output from the PLL.

2. The method of claim 1 wherein the indication of the time difference is a time error signal and wherein the method further comprises:
   determining a delay associated with conveying the first signal over the link;
   adjusting the time error signal based on the link delay and prior to an application of the time error signal to the phase locked loop.

3. The method of claim 1, wherein the first signal is a clock signal received from the digital subsystem.

4. The method of claim 1, wherein the radio subsystem and the digital subsystem are located remotely from each other.

5. The method of claim 1, wherein the radio subsystem and the digital subsystem each resides in a remote radio head.

6. The method of claim 1, further comprising synchronizing, by the digital subsystem, an another radio subsystem with the second signal.

7. The method of claim 6, wherein the another radio subsystem resides inside a location without an ability to receive Global Navigation Satellite System signals.

8. The method of claim 1, wherein the link is a control signal link used to exchange non-timing synchronization related control signals.

9. An apparatus for providing timing synchronization in a communication system, the apparatus comprising a base station having:
   a radio subsystem comprising:
      a first radio interface that is configured to receive a first signal from a first digital subsystem of a plurality of digital subsystems;
      a second radio interface that is configured to receive a second signal from a second digital subsystem of the plurality of digital subsystems;
      a comparator that is configured to determine a time difference between the first signal and the second signal; and
      an interface to a link to the at least one of the plurality of digital subsystems, wherein the link is not dedicated to timing synchronization and wherein the interface is configured to send, via the link, an indication of the time difference to at least one of the plurality of digital subsystems;

the at least one of the plurality of digital subsystems, comprising:
    a phase locked loop (PLL) that is configured to process the indication of the time difference received from the radio subsystem; and
    an oscillator that is configured to synchronize the base station with the second signal based on the output from the PLL.

10. The apparatus of claim 9, wherein the first signal is a clock signal received from the digital subsystem.

11. The apparatus of claim 9, wherein the radio subsystem and the digital subsystem are located remotely from each other.

12. The apparatus of claim 9, wherein the digital subsystem synchronizes an another radio subsystem with the second signal.

13. The apparatus of claim 12, wherein the another radio subsystem resides inside a location without an ability to receive Global Navigation Satellite System signals.

14. The apparatus of claim 9, wherein the link is a control signal link used to exchange non-timing synchronization related control signals.

15. The apparatus of claim 9, where the first signal is adjusted based on a determined link delay prior to determining a time error between the first signal and the second signal.

16. A remote radio head comprising the apparatus of claim 9.

* * * * *